(12) United States Patent
Chavez-Gil

(10) Patent No.: US 9,259,666 B1
(45) Date of Patent: Feb. 16, 2016

(54) COMPACT EXTRACTOR/SEPARATOR APPARATUS FOR SOLID/LIQUID/GEL SAMPLE

(71) Applicant: Tulio Chavez-Gil, San German, PR (US)

(72) Inventor: Tulio Chavez-Gil, San German, PR (US)

( * ) Notice: Subject to any disclaimer, the term of this patent is extended or adjusted under 35 U.S.C. 154(b) by 662 days.

(21) Appl. No.: 13/736,263

(22) Filed: Jan. 8, 2013

(51) Int. Cl.
*B01D 3/40* (2006.01)
*B01D 11/02* (2006.01)
*B01L 3/00* (2006.01)
*B01D 11/00* (2006.01)

(52) U.S. Cl.
CPC . *B01D 3/40* (2013.01); *B01D 11/00* (2013.01); *B01D 11/02* (2013.01); *B01D 11/0219* (2013.01); *B01L 3/56* (2013.01); *B01L 3/567* (2013.01); *B01L 3/569* (2013.01)

(58) Field of Classification Search
CPC .... B01D 11/00; B01D 11/02; B01D 11/0219; B01D 2011/002; B01D 2011/005; B01D 3/40; C11B 3/006; B01L 3/56; B01L 3/561; B01L 3/563; B01L 3/5635; B01L 3/565; B01L 3/567; B01L 3/569
USPC ........................... 202/168, 169, 170; 422/527
See application file for complete search history.

(56) References Cited

U.S. PATENT DOCUMENTS

| | | | | |
|---|---|---|---|---|
| 744,795 A * | 11/1903 | Reese | ............... | B01D 11/0203 202/168 |
| 2,006,513 A | 7/1935 | Betzold | | |
| 2,095,056 A * | 10/1937 | Clough | ............... | G01N 33/241 202/168 |
| 2,182,564 A * | 12/1939 | Leiboff | ................ | B01D 11/04 202/168 |
| 2,660,518 A * | 11/1953 | White | .................... | B01D 11/04 202/169 |
| 2,732,415 A * | 1/1956 | Klinge | .................... | B01D 11/02 202/168 |
| 3,107,205 A | 10/1963 | Wood | | |
| D198,160 S * | 5/1964 | Thompson | .................. | D24/222 |
| 3,721,265 A | 3/1973 | Hoffland | | |
| 4,006,062 A | 2/1977 | Bhuchar et al. | | |
| 4,162,199 A * | 7/1979 | English | ............. | B01D 11/0488 134/10 |
| 4,218,311 A | 8/1980 | Newrick | | |
| 4,238,451 A * | 12/1980 | Ciais et al. | ......... | G01N 33/2835 202/161 |
| 4,255,386 A * | 3/1981 | Schachter et al. | ..... | G01N 33/84 202/161 |
| 5,098,662 A * | 3/1992 | Killough | ............ | B01D 11/0219 202/168 |
| 5,156,812 A * | 10/1992 | Killough | ............ | B01D 11/0219 202/168 |
| 5,268,150 A | 12/1993 | Burkitt | | |
| 5,776,317 A | 7/1998 | Spring et al. | | |
| D413,678 S | 9/1999 | Anderson et al. | | |
| 6,790,318 B2 * | 9/2004 | Lai et al. | .................. | C08J 7/047 202/169 |
| 2002/0050449 A1* | 5/2002 | Kitamura et al. | ........ | B01D 3/14 202/161 |
| 2008/0128261 A1* | 6/2008 | Balass | .................. | B01D 5/0012 202/176 |

* cited by examiner

*Primary Examiner* — In Suk Bullock
*Assistant Examiner* — Jonathan Pilcher
(74) *Attorney, Agent, or Firm* — Hoglund & Pamias, PSC; Roberto J. Rios (57) ABSTRACT

The invention provides for the steam of a solvent to reach the space of an extractor following two possible routes thus exposing the sample to a continuous flow of fresh solvent, causing the extractant fluid to be fed through the sample by its upper and lower ends, which increases the extraction radius and as result a high percentage of the extracted component is obtained, reducing substantially the amount of solvent used and therefore reducing the processing time.

20 Claims, 5 Drawing Sheets

COMPACT EXTRACTOR/SEPARATOR APPARATUS FOR SOLID/LIQUID/GEL SAMPLE

BACKGROUND OF THE INVENTION

Several known desings of glass equipments have been proposed in the past to extract chemical substances from a solid, liquid or gel state. In general terms, the chemical extraction is carried out by two possible processes: continuous and discontinuous. For example, the methods for extraction and concentration of substances from samples such as: water environmental contaminants, plants and biological sample related medicines, are carried out in two different apparatus, one for the extraction process and the other for the separation process or occasionally, using a combined extractor/separator apparatus.

Therefore, the chemical substances to be extracted from a sample are dissolved by means of steam or a solvent in a continuous extraction apparatus, within a confined extraction space containing the material having the extractable component. The extracted substance is dissolved with the solvent within this extraction space and can be directed as an extract/solvent mixture to a reaction flask in a cyclic process in which the extract will be exposed to a solvent boiling temperature for extended period of times. This extraction method has been implemented in the industry for the last 120 years using a Soxhlet extractor, which establishes an automatic cycle for returning the extract towards the reaction flask using a siphoning system as the German Institute of Standard 12602 that occurs when the same solvent level with the content within the extraction space is reached. Thus, steam from the solvent reaches the extraction space in the conventional Soxhlet extractor when the solvent reaches its boiling temperature. This causes the condensate to still be hot when it drips through the sample, wherein the extracted substance is then siphoned towards the reaction flask where the solvent will be boiling. This extraction method is well suited for processes where the sample density is greater than the solvent density, as well as in molecules with high molecular weight. However, it shows poor efficiency with respect to the quality and purity of the extracted product in samples having densities lower than solvent density or in samples susceptible to high temperatures, such as biological substances, proteins, enzymes, etc. . . .

A similar extraction method known as "enriched extraction" is implemented using a Gregar extractor, developed at the Argone National Laboratory, Chemical Engineering Division where the continuous extraction principles previously explained are evident in the instrument design and its related methods. However, one disadvantage found in the conventional continuous extraction apparatus lies on the difficulty to perform the extraction through the supply of a fluid in two directions at the same time and the lack of monitoring the fluid temperature before it reaches the sample inside the extractor. Therefore, when more than one solvent is needed for extracting a substance of interest, the ideal process to reduce the working time would be to supply a mixture of solvents in a single step considering that more than one fluid will condensate over the sample if the boiling point of the mixture components is too close so that, additional work would be necessary to separate the extract contained on the mixture.

Previous apparatus have been designed to equilibrate the density difference between the solvent and the sample, which requires additional work in order to maintain the level of each component avoiding a fluid in opposite direction within the apparatus and the extract/solvent pressure are leveled in a hydraulic pressure equilibrium between two phases. To achieve such equilibrium, some previous extracting apparatus have components and additional designs that allow an operator to equilibrate these differences with some degree of operational risk. Thus, such extracting apparatus are subjected to special operational care directly related to the design and the assembly of the equipment to reach an equilibrium between the extract and the solvent volume, through a component or a piece that balances the hydraulic pressure inside the extractor and that satisfy the proportional relationship:

$$S_h \times S_\rho = \text{solv}_h = \text{solv}_\rho \quad (1)$$

Where S=sample, h=height, $\rho$=density, solv=solvent.

However, a technician operating an equipment designed to satisfy equation (1), will not always be mindful of reaching the ideal level of the relationship sample:solvent that satisfy the balance between them according to design parameters that operate over all the parts of the equipment.

Therefore, it is desirable to have a conventional extraction equipment and a related method that simplifies the process with a design that allows an operator to balance the level of liquids and the hydraulic pressure in a quick, simple and safe manner.

When a pure solvent or a mixture of solvents is heated in a reaction flask, steam generated creates a lineal or crossed flow inside a conducting cylinder or over an interfering sphere, exhibiting a complex pattern according to thermodynamics. Liquids and gases share two intensive properties (density, d, and viscosity, $\rho$) directly related to their fluidity and velocity inside a transporting system. However, a gas is more fluid than its original liquid in a transporting phenomenum and thus, its viscosity, which is defined as the resistance that a part of the fluid shows to the displacement of the other, controls the process. Viscosity is produced by a cutting effect of a layer of fluid when displacing over other and is completely different than the so called intermolecular attraction. Assuming that a liquid stratifies in molecular planes, a plane's area is defined as A, and the interplanar distance as dy. Also assuming that each plane moves to the right with velocities $v_1$, $v_2$, etc., where each value is greater than its predecessor by increment dy. The flow occurring according to this is called laminar, and is different than the turbulent where plane parallelism is not observed. In the laminar flow, the force required to maintain a stationary velocity difference dv between two parallel planes is directly proportional to A and dv, and is inversely proportional to dy. Therefore:

$$f = \eta A \frac{dv}{dy} \quad (2)$$

where f=fluid force, $\eta$=fluid viscosity coefficient, or simply fluid viscosity, the amount dv/dy in equation (2) refers to the cut velocity, Vc, while the relationship f/A, force per unit of area is called the cutting force, F. Thus, in terms of Vc and F equation (2) transforms into:

$$\eta = F/A \quad (3)$$

In this way, both equations (2) and (3) could be taken as expressions that define $\eta$ and the practical application of these properties depends on the validity of a series of experimental assumptions, especially when the flow is laminar.

When designing a fluid transportation system, the onset conditions for turbulent flow depends on the magnitude of a certain combinations of experimental variables pertaining to a pure number called the Reynolds, $R_e$. For a flow through a large pipe, cylindrical and lineal this number is proportional to:

$$R_e = rv\frac{\rho}{\eta} \quad (4)$$

where $\rho$ is the fluid density and r is the pipe radio. It has been found empirically, that a laminar flow is always obtained in the same pipe when $R_e$ is less than $10^3$, by virtue of the magnitude of any individual variable, r, v, $\rho$, $\eta$. Also, the laminar flow of a fluid depends on the regularity of the wall surface and the entrance form of the pipe, as well as on the internal length L' of the transition region, since it is very important that this transversal section be very small in comparison to the pipe length, in a relationship:

$$L' = \frac{1}{4}R_e r \quad (5)$$

where r is the pipe radio and $R_e$ is the Reynolds number. It is inferred from this relationship, that the pipe must be tight to obtain a laminar flow and the Reynolds number could be considerably reduced if the pipe is substantially curved.

SUMMARY OF THE INVENTION

The present invention provides for the steam of a solvent to reach the space of the extractor following two possible routes thus exposing the sample to a continuous flow of fresh solvent, causing the extractant fluid to be fed through the sample by its upper and lower ends, which increases the extraction radius and as result a high percentage of the extracted component is obtained, reducing substantially the amount of solvent used and therefore reducing the processing time.

The invention disclosed has a special design and a method in which the temperature of the steam generated by diverse components in a mixture of solvents, can be continuously monitored allowing the operator to take action on the process to eliminate the possibility that the condensed is formed by unwanted extraction substances.

According to the present invention, the temperature of steam of the fluid is continuously monitored in any method of extraction or separation regardless of the material state of the sample. Thus, the extract of the substance(s) is concentrated within the space of the extractor with the possibility of being, a) drained towards the reaction flask in a process of continuous extraction, or b) can be directed towards a separation flask continuously or in stage-by-stage manner where the product is collected for chemical physical analysis, or separated as a final product of the process.

The apparatus of the present invention has been designed following thermodynamic of fluidity relationships, pressure and temperature in pipes of different diameter and length, to make of extraction process simple, safe and cost-effective.

According to an aspect of the present invention, fluid is initially transported through a pressure exchange chamber composed of a large cylindrical section which is crossed in its center by a pipe of reduced diameter fused in the upper part of the chamber, where it is connected with a second interchange chamber, wherein that exit is obstructed by the surface of a sphere that rests freely over the concave base of the second chamber. That chamber in turn, has a reduced lateral connection port that communicates with a pressure control valve.

According to another aspect of the invention, some particles of the fluid are concentrated in the space having a greater diameter and other particles travel through reduced section pipe exerting pressure on the surface of the sphere on its middle plane, which when striking the sphere causes the speed of the fluid to diminish or stops completely, wherein at this point the greatest pressure will be reached within the chamber.

According to still another aspect of the invention, the connecting pipes for transporting the solvent and the extract have different internal diameters (1.5-2.0 mm) in order to provide the apparatus means for changing the pressure that adjust to routes of circulation according to the nature or phase of the sample and the density of the solvent.

The components for changing the pressure according to the present invention, are interconnected allowing any operator to control any over-flow in the circulation of steam during a continuous process.

According to one aspect of the invention, the design and construction of a glass extraction apparatus is efficient and economic, as well as a method for the continuous extraction of sufficient amount of chemical components of a sample by using a minimum amount of solvent as an extraction means.

According to another aspect of the invention, an efficient extraction glass apparatus is provided and a method of stage-by-stage extraction of organic components of plants and other biological samples susceptible to decomposition by high temperatures.

According to yet another aspect of the invention, a glass extracting apparatus and a method is provided for easily extracting biological oils of seaweed, by obtaining azeotropic mixtures of organic solvents in situ.

According to an aspect of the invention, a glass extracting apparatus and a method is provided that facilitates the extraction of biological substances like proteins and enzymes, by using azeotropic mixtures of low boiling point.

According to another aspect of the invention, an efficient glass apparatus and a method is provided for the separation of environmental contaminated water polluting agents, as well as the separation of organic solvent mixtures to be used in extraction processes in situ.

According to still another aspect of the invention, a compact glass apparatus is provided that eliminates supplemental parts and can be easily used by an inexpert operator.

BRIEF DESCRIPTION OF THE DRAWINGS

These and other aspects and advantages of the present invention are more apparent from the following detailed description and claims, particularly when considered in conjunction with the accompanying drawings, in which:

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

Figure 1:
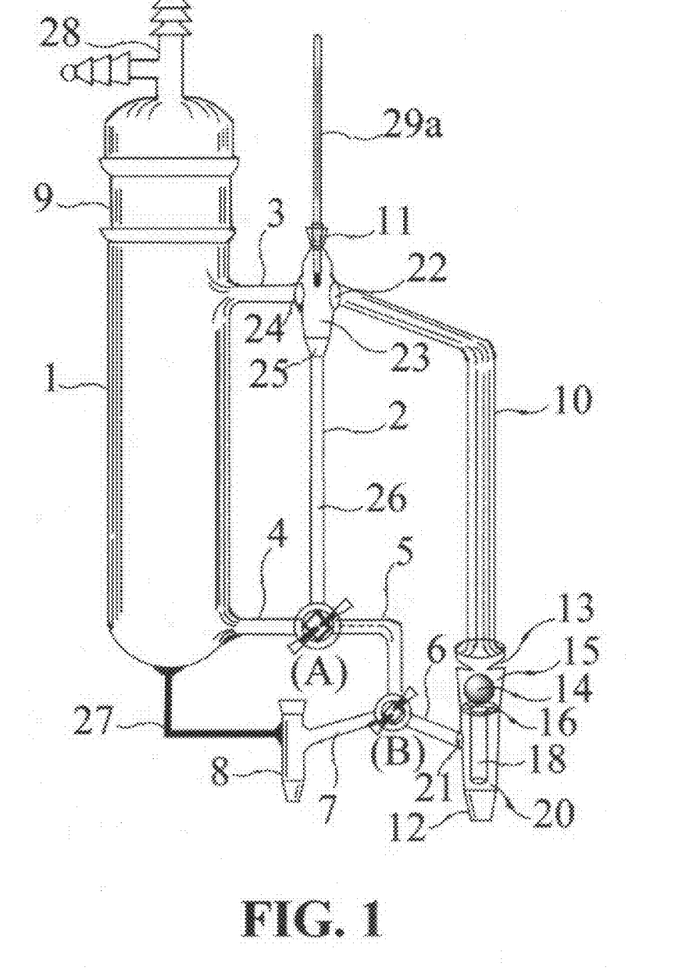
FIG. 1 shows a front view of the apparatus according to the present invention.

FIG. 1 shows an extraction apparatus called continuous or step-by-step extractor according to the invention. The cylinders of the extractor/separator and the steam feeding lines where made as a single glass piece with two valves to regulate the pressure and two chambers of pressure exchange directly embedded over a column of reflux obtaining a compact apparatus. This compact size is especially convenient to be used in organic chemistry laboratories, phytochemistry, extraction of biological oil from algae, biological substances like proteins, enzymes and environmental samples, where the extractors/separators should be washed or sterilized periodically to be used with a great variety of solvents. According to my design the apparatus can be easily washed to prepare an inert sample exposed to a fresh solvent without the need of disarming the equipment. A special advantage in the construction of this extractor/separator equipment arises when two spaces with different capacity, that is, space 1 of a large vertical pipe supporting the atmospheric pressure plus the hydraulic pressure of the extractor/solvent is embedded to a second pipe vertical tight pipe 2 by means of a connecting cylinder having a reduced section 3 on its upper side and another cylinder of reduced diameter 4 on the lower side, both connectors positioned on the right side of the equipment and ending on an open space 9 on its upper side available for cooling a fluid.

Another especial advantage of the invention is achieved when the second parallel pipe 2 is a large cylinder comprising an open section 11 on its upper side and available to accommodate additional peripheral elements, a cylindrical condensation head 23 that connects with pipe 1 through connector 3 in port 24, followed by a conical section 25 and extends down with a reduced-section area 26 that is embedded with a "T" valve embedded to connector 4, completing the union between both main pipes.

Another special advantage of the invention is that the steam of a fluid could reach the main estractor due to the differences between the atmospheric pressure inside pipe 1 and the hydraulic pressure of the fluid inside the pre-cooling pipe 2. That is, the positive pressure of the fluid could reach extractor 1 fast through connectors 3 or 4 by manipulating the flow control valves A and B, which act automatically over a glass sphere 14 with a movement defined by small pressure differences inside extractor pipe 1 and the other parts of the apparatus together. Therefore, the apparatus allows a mixed process of extraction/separation in a single step, facilitated by manipulating the two steam pressure control valves allowing an operator to initially, a) separate from a mixture of solvents a highly pure azeotrope in situ, to b) continue extracting which requires using more then one solvent and stage to be processed.

Also, the sample to be processed could be positioned directly inside extractor 1 or inside a thimble 32, made from a variety materials and having a permeable bottom. The extraction pipe 1 has in its right lower side a port connecting pipe 4 that allows the steam or solvent to enter/exit favoring extraction or separation and is also fusion point between the two parallel pipes and establishes the communication with the pressure control valve A and with the component located at the lower part of the apparatus.

Figure 2:
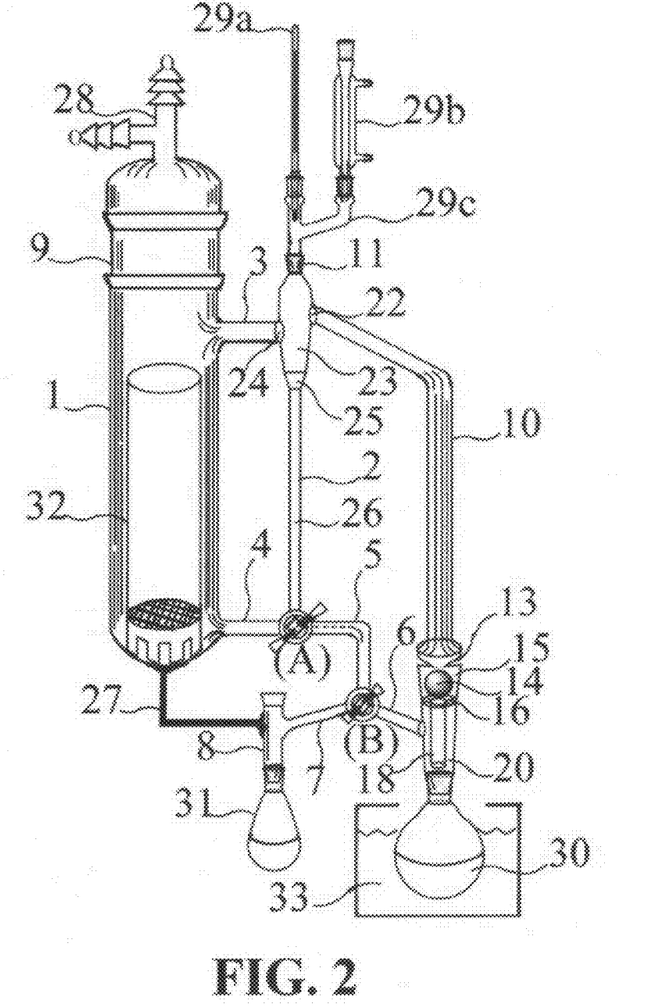
FIG. 2 shows another front view of the apparatus with additional accessories according to the present invention.

Valve A is located at the right side of the connector 4 to control the fluid and the pressure, which also acts as a connecting bridge between 1 and 2 as well as with the transporting pipe 5. Transporting pipe 5 has a reduced cross-sectional area and is designed forming a preferred angle of 90° in vertical direction and connects valves A and B. Parallel pipe 2 has an advantageous design as shown in FIG. 2 where on its upper side section 11 is an open space available to accommodate a series of distillation components being at the same time the specific point to easily monitor the steam temperature that travels through 10 or through the two segments of 2 prior to reaching the cooling space 9. Pipe 2 operates in such a way that steam could reach the main extractor through connecting pipe 3 at observed high temperatures if steam or fluid travels down following the path of enter/exit pipe 4. Thus, steam generated in 30 could be directed towards 1 in a straight line through the distillation pipe to reach the pre-cooling space 23, passing directly to the second condensating space 9 through connecting pipe 3.

Segment 23 is a long and wide space that acts as an exchange chamber from where steam can follow towards 1 through 3, or it is condensed later to reach the condensed sample like condensate through 4. The exchange chamber 23 plays an important roll in the operation of the invention since as shown in FIG. 1 if the window of communication 22 is constructed in a parallel plane or inferior to the location of port 24, the over-flow of the condensate on chamber 23 will end up returning to the reaction flask 30 through cylinder 10 without reaching the main extractor if valves A is on position IV and B on position I, according to FIG. 4.

Figures 3, 5:
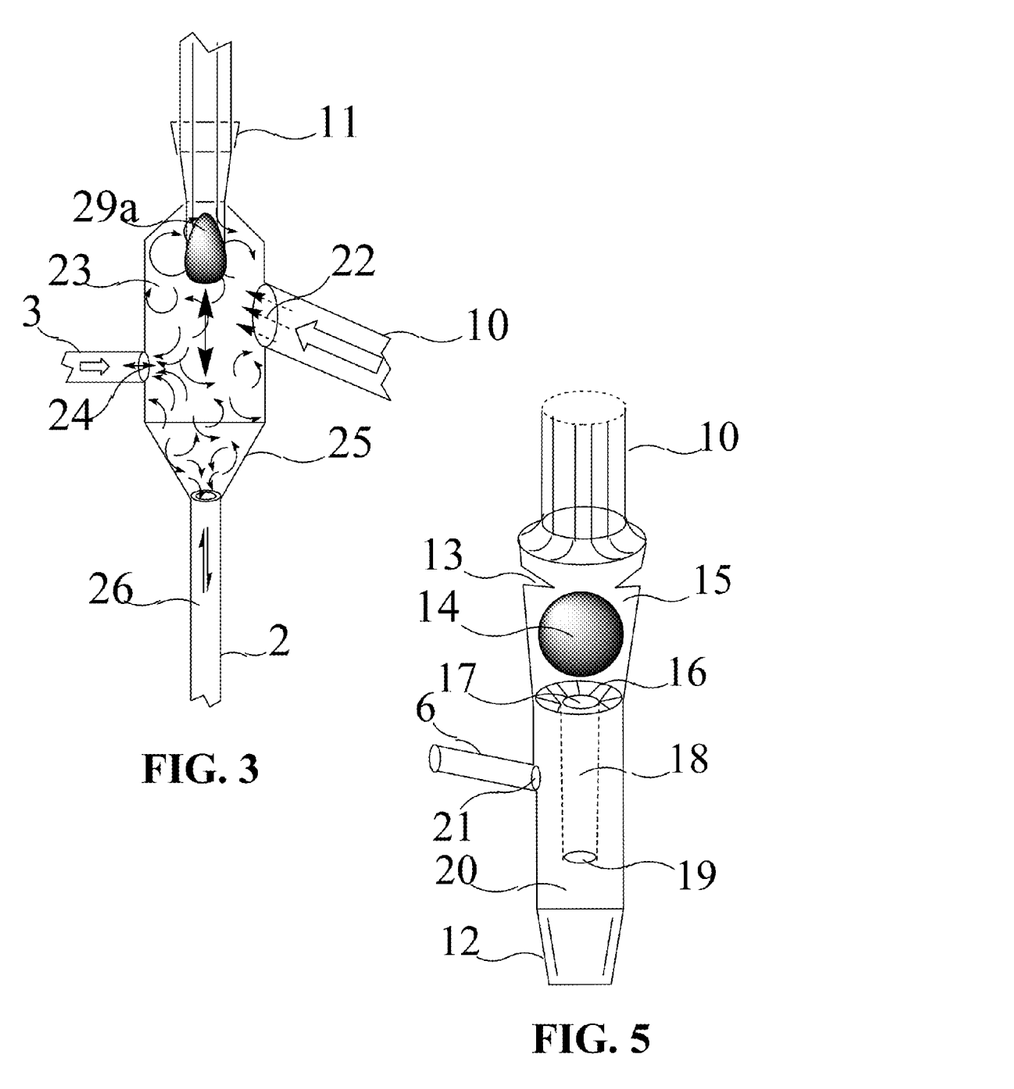
FIG. 3 shows a detailed view of an exchange chamber according to the present invention.
FIG. 5 shows a general scheme of the exchange chambers 15 and 20 according to the present invention.

It is for that reason that welding port 22 to the distillation column, a centimeter over the plane occupied by window 24 of connector 3 as shown in FIG. 2, in order to balance the hydraulic pressure of the extract and the solvent, the later having the possibility to descend through reduced sections 25 and 26, reaching the extractor by connectors 3 or 4 depending on the phase in which the extractable substance is in 23 (condensate or steam). Furthermore, the design of segment 23 deserves special attention since inside the segment several phenomenons occur such as: mass and heat transport, phase transition of steam due the temperature or the quick change of pressure inside the space as a consequence of the fast collision of different quantities of the steam flowing at different pressure and temperature, reaching 23 through windows 22 and 25, with the atmospheric pressure entering through 24 and/or 11, but being greater the pressure exerted by the fluid entering through cylinder 10 discharging in the chamber. That way, the flow of a solvent with a high density that reaches chamber 23 through reflux cylinder 10 condenses quickly and is unloaded towards the extractor 1 through the elongated segment of reduced diameter 26, pushed through the semi-stationary mass of solvent in the conical section 25 plus the addition of the atmospheric pressure entering through 24 and the pressure of steam raising on 10, all of that exerting maximum pressure over all the areas of the chamber as shown in FIG. 3.

The inverse flow of the extract against the hydraulic pressure of the solvent that descends within 1, increases the extraction by means of the solvent that is falling within the extractor through 4 and moving at high pressure within the reduced segment 26 causing a great amount of solvent drips through the sample in opposite direction of the atmospheric pressure, establishing a balance of phases between the densities of the solvent and the sample extracted due to the high pressure that exerts the mass descending on 2 far superior than the constant mass of the sample in 1. Thus, it is concluded that this construction detail in the invention solves the difficulties found in previous extractors where it is necessary a plurality of accessories that allows to balance in a limited way the joint internal pressures extractor/concentrator when the densities of the sample and the solvent are different as usually happens.

On the same pipe 2 on its right superior side, a connection port 22 establishes the first point of conección with the column of distillation 10 in a preferred angle of 75°. This angle allows that the steam reaches the pre-cooling segment 23 at high pressure taking into account that previous to this, the steam must have raised the mass 14 to continue raising through the distillation pipe. Therefore, the steam or fluid that reaches the extractor 1 will be at high temperature and the peripheral accessories on 29c (a and b) are necessary so that the operator can control the extraction process when the nature of some extracted product is sensitive to the temperature of the solvent. The condensation space 9 can be occupied by an accessory containing an arbitrary cooler that provides the necessary temperature for the condensation of the steam in the extraction pipe 1.

Figure 4:
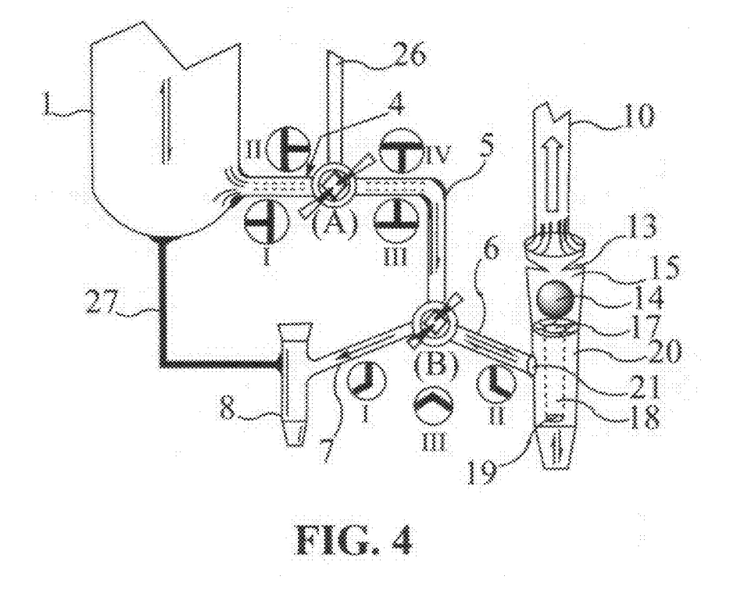
FIG. 4 shows a general scheme of the operation of valves A and B according to the present invention.

Another advantageous design according to the invention is obtained by making the second pressure control valve B of Teflon or glass, constructed forming a preferred angle of 120° and through one of its segments the valve connects with the collecting exit pipe 7 towards its left side and with the connection pipe 5 upwards and with 6 towards the right side. The exit connector 7 is designed to be used in extraction processes or separation of continuous or stage-by-stage type of a material to be collected in the receiver 8 as shown in FIG. 4. In addition, connector 7 is the accessory used to introduce inert gas to the apparatus when necessary or also the exit way in extraction/separation processes under conditions of medium or high-vacuum.

As shown in FIG. 4, the entrance/exit connector 6 acts like the second point of fusion between the lower right side of 2 and the left side of the exchange chamber 20, where the steam generated in 30 can be guided towards the main extractor flowing through valves B (position II) and A (positions II, III or IV), entering extractor 1 by 3 if (i) the fluid reaches the upper side of pipe 2 at low temperature, this is due to the high pressure of the steam flowing through the reduced diameter connectors 5, 26, 25 to then condense in the cooling space of condenser 28 and fall on the sample, or (ii) to reach the extractor like condensate at high temperature if thermometer 29a is placed in 11 being therefore the sample dripped upwards by the solvent when this enters the extractor through 4, this time with the valve A on position III.

In a preferred extraction process, when the steam or fluid is directed through distillation cylinder 10 in conjunction with the set of pieces 6→B→5→A→26→25, a great amount of the extractant fluid reaches extractor 1 quickly through 3 to condense in 9 and drip the sample in large volume. An extraction process following these two routes, causes in a short time a considerable enrichment of the extracted substance in the extract, independently of the ratio of the relation that appears between the density of the solvent and the sample.

An extraction can also happen in a continuous or stage-by-stage form according to FIG. 4, if one or more solvents with differences in boiling points of at least 10° C. are placed on 30 and control valve A is opened downwards (position IV) so that the substance dissolved in the solvent is removed by gravity and making sure that valve B is positioning towards its left side (position I). This operation directs the substance towards connector 7 to be separated in flask 31 placed in 8, whereas a continuous extraction will be maintained if valve B is moved towards its right side (position II) with the substance flowing through 6 passing through 20 towards the reaction flask 30. Thus, the effectiveness of an extraction must be partly favored when the solvent selected has a density greater than the sample if the accessory placed in 11 is only a thermometer 29a, while the process will be favored in solvents with density lower than the sample if the accessory on 11 is only 29b or 29c with their respective accessories as shown in FIG. 2. Using adapter 29c with its complementary elements (a and b), the extraction can also be made with the fluid or steam at low temperatures which favors the extraction with solvents having lower density than the sample.

FIG. 4 is also an illustration of what happens in an extraction when valve A is in position I (opened towards extractor 1) and valve B also in position I (closed for chamber 20), obtaining that a great volume of steam is quickly directed towards the pre-cooling chamber 23 through cylinder 10, dripping the sample in both directions and the extract concentrating itself until reaching a determined level by the operator as a result of the movement of the solvent within the parallel pipes in a very short time.

Inversely, if both valves A and B are directed towards their right direction (position II), a great amount of the extract will be concentrated in the body of extractor 1 which can be removed if B is moved towards its left side (position I) and recovered in the collecting pipe 8, or a continuous process could be maintained indefinitely depending on the volume of solvent placed in 30. Definitively, the design and positions of the valves A and B according to the invention confer to any process of extraction or separation a special advantage due to the easy access that has the operator over the direction, pressure and circulation of a fluid or substance generated in some parts of the apparatus.

A key device in the construction of the invention is shown in FIG. 5, whose detailed view corresponds to a glass sphere 14 (preferably colored) whose form, mass and disposition introduces in the design the possibility of directing fluid or steam in a predetermined direction in order to balance the density of a substance and the density of a solvent of a simple and safe way, besides creating a seal between the surfaces 16 and the sphere in the exit port 17. Another important advantage of this device is its regulating function of the temperature on the steam that is diverted by the reduced connectors until reaching 1 through 4, different from the temperature of the steam that raises in 10 to reach 23. Thus, as the hot steam reaches the exchange chamber 20 it flows from the bottom of 18 and therefore, the sphere is agitated upwards by the steam and its elevation will depend on the speed and pressure of the fluid or steam. Therefore, the force of agitation of the sphere indicates in general terms the amount of steam flowing between the two chambers and the operator could quickly regulate the flow of hot or lukewarm steam by manipulating the two valves controlling the pressure and direction of the steam A, B even before the solvent has initiated its heating in the reaction flask.

This special design according to the invention, operates over the pressure of steam or the fluid by means of the thermodynamic inequality:

$$\text{ball}_{mass} + P_{atm} + \text{fluid}_{mass} + \text{gravitational force}\ (g) >>> P_{vap} \text{ whittin set } [6,5,4,26,25,24] \quad (6)$$

Thus, when the steam of a solvent reaches the exchange chamber 20, the lateral port 21 is available to deviate the steam at low temperatures towards the set cylinders 6→5→4→26 reaching extractor 1 at low pressures, or to be fed upwards through column 10 at high pressure and temperature when valve B is closed (position I). FIG. 4 is a simple illustration of the coordinated operation between the valves A and B with the movement of ball 14 within chamber 15 by the effect of the positive pressure of the steam that flows through the reduced-section cylinder 18 and whose temperature will be very high at the time of striking the inferior surface of the ball. Thus, if valve B is in position I, (FIG. 4) the pressure of the steam raising by 18 will raise ball 14 inside the chamber 15 until limits defined by intruders 13 that avoids that the ball moves an out of proportion distance and on its fall can break base 16. As it is described in the inequality (6) the fixed movement of 14 is due to the change of pressures between the two adjacent chambers by the pressure exerted upwards by the hot steam in 20 which should counteract in 15: a) the weight of 14, b) the atmospheric pressure in 15, c) the mass of fluid condensed on 14, and d) the gravity force acting on 14. Thus, when valve B is in position I, hot fluid will surround sphere 14 forming a turbulent flow that will make it turn in the fluid which will initially condensed on 14 helped by intruders 13 and the steam with greater temperature will end up raising through 10 reaching the chamber 23 and therefore extractor 1.

On the contrary, a change in the position of valve B towards its right side (position II) and moving valve A to one of positions II, III or IV, will cause a fall of the pressure of the steam in 20 making the pressure in 15 very high, whose immediate effect will be to deviate the direction of the steam towards the set of reduced section cylinders 6, 5, 4, 26, 25 and 3, respectively. Another fundamental piece according to the invention is one constructed outside the limits of fusion between the two parallel cylinders, comprising a distillation cylinder 10 that communicates exclusively with the pre-cooling cylinder 2 through a port 22 fused among them and constituting in a third parallel cylinder. This glass design has two points of conección according to the invention, a port 22 in its upper side fuses the distillation tube with segment 23 of the pre-cooling pipe 2, whereas its lower side ends fused with the upper side of chamber 15 over intruders 13 forming a compact piece. Port 22 as shown in FIG. 3, is a preferred design forming an angle of 75° which acts like an entrance port of the hot steam.

FIG. 5 shows a front view of the farthest portion of the apparatus between the lower side of cylinder 10, the reaction flask 30 and the connection port 21. This arrangement complements its operation with the manual action of the flow control valves A and B and its direct action on the movement of sphere 14, as a result of the pressure differentials between the chambers pressure exchange 15 and 20 and the existing pressure in the pipe of greater diameter 10, 23 and 1, respectively. This last section of the design is a compact piece which consists of a great space 15 flanked above by the end of pipe 10, three intruders 13 similar to those of a Vigreux column whose function is to prevent that the glass sphere 14 moves away of the base 16 with concave form which is the lower limit of the chamber, opened to an entrance port 17 that is connected with the adjacent chamber 20 through an internal pipe 18, opened in its lower end 19 in this chamber. The lower end of the piece is formed by the exchange chamber 20 which communicates with the reaction flask 30 through its polished conical end 12 and in the left wall of the chamber an entrance/exit port 21 is the final seal of the components according to the invention, where it merges with the pressure control and flow valve B through connector 6.

An additional advantage in the compact design according to the invention, allows the use of an inert gas which could be introduced through the collector device 8 when valve B is placed in position III as shown in FIG. 4 and valve A is directed towards its left side (position I), allowing the inert gas to enter extractor 1 through connector 3 with space 9 acting like pressure regulating area. Moreover, if both valves A and B are constructed in a boron-silicate material (plug and leg) and the upper section of pipes 1 and 2 are hermetically sealed, the extraction or separation of a substance could be performed under a partial vacuum or a high-vacuum using the output device 7 with the turning piece in both valves directed towards its left side (position I) as shown in FIG. 4, this time connection 8 to a vacuum pump.

Finally, manipulation of the control valves A and B allows the operator to remove condenser 28 and placed it on the extractor 1 at any time without danger, when an extraction process requires continuous cleaning of the apparatus or periodic replacement of fresh samples, except when is operating under vacuum conditions.

Figure 6:
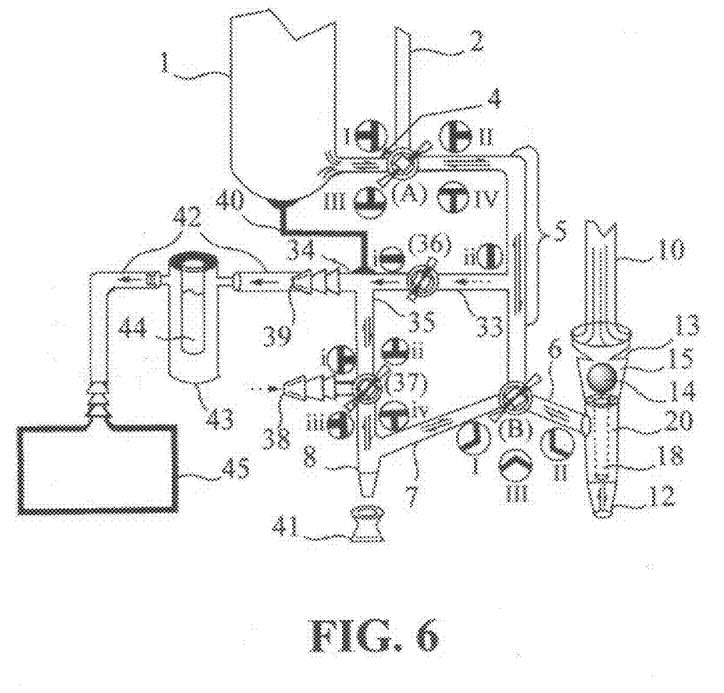
FIG. 6 shows a general scheme of the apparatus under a high-vacuum condition according to the present invention.

Thus, successive operation of the apparatus according to the invention does not require a re-regulation of the condenser allowing that the extractor 1 or thimble 32 could be filled with fresh samples at any time of the operation without the need to disarm the apparatus. FIG. 6 relates to an additional design according to the invention for vacuum or ultra-vacuum operations in which volatile substances or toxic gases are generated, recoverable in external storage systems (not shown). An exemplary description of how an operator can manipulate the set of valves in an efficient and safe way is the following:

A. Moderate Vacuum:
1. The upper end of coolers 28 and 29c must be sealed,
2. The extraction or separation sample must be placed in the extraction cylinder 1 or reaction flask 30, respectively,
3. Through port 38 a flow of weak-moderate inert gas (example, Ar, $N_2$) will be introduced with valve 37 placed in position iv, connector 8 sealed in its final end with 41 and valve B directed downwards (position III),
4. At the same time, valve A should be placed in position IV during an extraction or separation, respectively.
5. To complete the vacuum operation, valve 36 will be placed on horizontal (position i) allowing the material of interest to be evacuated through segments 33, 34 and to finally exit through port 39 by the action of a vacuum pump to be cooled in an external trap (not shown).

B. High-Vacuum:
6. The same as in step 1 and step 2,
7. Valve B on position III, valve A in position IV, the terminal of sealed pipe 8 with 41, the ports 38 and 39 connected together to a high-vacuum (45) and the valves 36 on position i and 37 on position ii, respectively.

Also an extracted or separated substance in accordance with FIG. 2, can be quickly dried by the action of a moderate vacuum or under an inert gas flow if this one is contained in flask placed in the lowest end of the collecting tube 8 and valve B is directed towards its right side (position II, closed). The same process using the system shown in FIG. 6, will require valve B to be in position II (closed), valve 37 in position iv connected to a vacuum pump 45 through port 39. In addition, a cooler 44 located inside a trap 43 can be coupled to segment 34 via connector 42. A vacuum pump 45 is also coupled to the cooler/trap arrangement via another connector 42. The arrangement shown in FIG. 6 is an optimal implementation in the extraction or separation of light substances contained in biological samples as aromas in flowers, organic molecules as well as volatile polluting agents molecules dissolved in water.

Finally, two security glass rods 27 and 40 contribute to secure the farthest portion of the apparatus comprising: a) the reduced diameter cylinders 5, 6, 7, b) the control valves A, B, 36, 37, and c) additional ornamentation for vacuum operation, with the lower part of main extractor 1. In a preferred embodiment, glass is used to make the apparatus and is satisfactory and appropriate for all the parts with the exception of the key of valves A and B made of Teflon. In other words, the compact extractor, comprising: pipe 1, the pre-cooling parallel pipe 2, the distillation pipe 10, the feeding lines 3, 4, 5, and 6, the reaction flask 30, the ball 14, the collecting pipe 8 and its connector 7, the receiving flask 31, and cork 41 are all made in glass, facilitating cleaning of the equipment as well as preventing any chemical activity resulting by the use of other materials.

Because many varying and differing embodiments maybe made within the scope of the inventive concept herein taught and because many modifications may be made in the embodiment herein detailed in accordance with the descriptive requirement of the law, it is to be understood that the details herein are to be interpreted as illustrative and not in a limiting sense.

I claim:

1. A vertical extractor/separator for a continuous or stage-by-stage process comprising:
   an extraction tube having a first volume configured to receive a sample, having a first open upper part and a second closed lower part opposite to said first open upper part, a right extraction upper port and a right extraction lower port;
   a pre-cooling tube having a second volume smaller than said first volume, a second opened upper part, an exchange chamber below said second opened upper part, a pre-cooling left port structurally connected to said right extraction upper port, a pre-cooling right port opposite to said pre-cooling left port and vertically located above said pre-cooling left port, a bottom portion below said exchange chamber having a diameter smaller than the diameter of said exchange chamber, an elongated tube parallel to said extraction tube and having an upper portion and a lower portion, wherein said upper portion is structurally connected to said bottom portion;
   a distillation column having an upper distillation part structurally connected to said pre-cooling right port, a distillation mid part parallel to said elongated tube, a distillation lower part;
   a first valve having a first valve upper port structurally connected to said elongated tube lower portion, a first valve left port structurally connected to said right extraction lower port through a second reduced-diameter tube, a first valve right port;
   a second valve having a second valve upper port structurally connected to said first valve right port, a second valve right port and a second valve left port structurally coupled to a collection tube;
   a pressure exchange chamber comprising a first chamber having a first chamber upper and lower part and a second chamber having a second chamber upper and lower part, wherein said first chamber upper part is structurally connected to said distillation lower part, the first chamber lower part is structurally connected to said second chamber upper part, said second chamber lower part having a diameter smaller than said second chamber upper part diameter, a second chamber left port structurally connected to said second valve right port.

2. The extractor/separator of claim 1, further comprising an extraction cooling arrangement structurally connected to said first open upper part.

3. The extractor/separator of claim 1, further comprising a thermometer coupled to said second opened upper part.

4. The extractor/separator of claim 1, further comprising an external cooler coupled to said second opened upper part.

5. The extractor/separator of claim 1, further comprising a pre-cooling adapter having an adapter lower portion coupled to said second opened upper part, a first adapter upper portion and a second adapter upper portion.

6. The extractor/separator of claim 5, further comprising a thermometer coupled to said first adapter upper portion.

7. The extractor/separator of claim 5, further comprising an external cooler coupled to said second adapter upper portion.

8. The extractor/separator of claim 1, wherein said upper distillation part is structurally connected to said pre-cooling right port at an angle of 75° with respect to said pre-cooling tube.

9. The extractor/separator of claim 1, wherein said upper distillation part is structurally coupled to said distillation mid part at an angle of 105° with respect to each other.

10. The extractor/separator of claim 1, further comprising a spheric element enclosed within the first chamber, said first chamber upper part comprising a dent arrangement restricting an upward movement of said spheric element, said first chamber lower part comprising a receiving base restricting a downward movement of said spheric element, said receiving base comprising a base opening.

11. The extractor/separator of claim 10, further comprising a second chamber cylinder longitudinally extending inside said second chamber and having a first open end structurally coupled to said base opening and a second open end.

12. The extractor/separator of claim 10, wherein said receiving base in concave.

13. The extractor/separator of claim 1, wherein said second valve upper port, said second valve left port and said second valve right port are separated 120° from each other.

14. The extractor/separator of claim 1, further comprising a vacuum valve having a first vacuum valve port structurally coupled to a point between said second valve upper port and said first valve right port, and a second vacuum valve port structurally coupled to a collection trap containing a cooling element within.

15. The extractor/separator of claim 14, further comprising a vacuum pump structurally coupled to said collection trap.

16. The extractor/separator of claim 14, further comprising an inlet valve having a first inlet valve port structurally coupled to a point between said second vacuum valve port and said collection trap, a second inlet valve port structurally coupled to said collection tube, and a third inlet valve port configured to either receive a gas or a vacuum pump connection.

17. The extractor/separator of claim 1, wherein said first valve is selectively operated to:
   a. allow unblocked connection between said first valve upper port and said first valve left port, and block said first valve right port;
   b. allow unblocked connection between said first valve upper port and said first valve right port, and block said first valve left port;
   c. allow unblocked connection among said first valve upper port, said first valve right port and said first valve left port; and
   d. allow unblocked connection between said first valve left port and said first valve right port, and block said first valve upper port.

18. The extractor/separator of claim 1, wherein said second valve is selectively operated to:
   a. allow unblocked connection between said second valve upper port and said second valve left port, and block said second valve right port;
   b. allow unblocked connection between said second valve upper port and said second valve right port, and block said second valve left port; and
   c. allow unblocked connection between said second valve left port and said second valve right port, and block said second valve upper port.

19. The extractor/separator of claim 14, wherein said vacuum valve is selectively operated to either allow unblocked connection between said first vacuum valve port and said second vacuum valve port or block a connection between said first vacuum valve port and said second vacuum valve port.

20. The extractor/separator of claim 16, wherein said inlet valve is selectively operated to:
 a. allow unblocked connection between said first inlet valve port and said second inlet valve port, and block said third inlet valve port;
 b. allow unblocked connection between said first inlet valve port and said third inlet valve port, and block said second inlet valve port;
 c. allow unblocked connection among said first inlet valve port, said first second inlet valve port and said third inlet valve port; and
 d. allow unblocked connection between said second inlet valve port and said third inlet valve port, and block said first inlet valve port.

* * * * *